(12) United States Patent
Mizukami et al.

(10) Patent No.: US 11,255,351 B2
(45) Date of Patent: Feb. 22, 2022

(54) ACCUMULATOR

(71) Applicant: NHK SPRING CO., LTD., Yokohama (JP)

(72) Inventors: Hiroshi Mizukami, Yokohama (JP); Mieko Yanagida, Yokohama (JP); Ippei Iwai, Yokohama (JP)

(73) Assignee: NHK SPRING CO., LTD., Yokohama (JP)

(*) Notice: Subject to any disclaimer, the term of this patent is extended or adjusted under 35 U.S.C. 154(b) by 40 days.

(21) Appl. No.: 16/492,719

(22) PCT Filed: Jan. 25, 2018

(86) PCT No.: PCT/JP2018/002307
§ 371 (c)(1),
(2) Date: Sep. 10, 2019

(87) PCT Pub. No.: WO2018/168216
PCT Pub. Date: Sep. 20, 2018

(65) Prior Publication Data
US 2020/0032819 A1    Jan. 30, 2020

(30) Foreign Application Priority Data
Mar. 13, 2017    (JP) .............................. JP2017-047751

(51) Int. Cl.
*F16L 55/04*    (2006.01)
*F15B 1/10*    (2006.01)
(Continued)

(52) U.S. Cl.
CPC ................ *F15B 1/103* (2013.01); *F15B 1/24* (2013.01); *F16L 55/053* (2013.01)

(58) Field of Classification Search
CPC ............ F15B 1/103; F15B 1/24; F16L 55/053
(Continued)

(56) References Cited

U.S. PATENT DOCUMENTS 2,267,121 A * 12/1941 McMullen ............ F16L 55/052
417/394
2,385,016 A *  9/1945 Mercier .................... F15B 1/18
138/30
(Continued)

FOREIGN PATENT DOCUMENTS

CN    101936312 A    1/2011
CN    105508317 A    4/2016
(Continued)

OTHER PUBLICATIONS

English translation of Written Opinion issued in Intl. Appln. No. PCT/JP2018/002307 dated Mar. 20, 2018, previously cited in IDS filed Sep. 10, 2019.
(Continued)

*Primary Examiner* — James F Hook
(74) *Attorney, Agent, or Firm* — Rossi, Kimms & McDowell LLP

(57) ABSTRACT

An accumulator includes a pressure vessel including a first section and a second section joined to each other via a joint portion and a partition portion separating an interior space of the pressure vessel into a liquid chamber and a gas chamber so that a volume ratio between the liquid chamber and the gas chamber in the pressure vessel is variable. The first section includes a thread portion for fastening the accumulator to a support member. The second section includes an abutting portion disposed opposite to the thread portion across the joint portion in an axial direction of the thread portion and configured to abut on the support member when the accumulator is fastened to the support member.

11 Claims, 8 Drawing Sheets

(51) Int. Cl.
*F15B 1/24* (2006.01)
*F16L 55/053* (2006.01)

(58) Field of Classification Search
USPC .................................................. 138/30, 31
See application file for complete search history.

(56) References Cited

U.S. PATENT DOCUMENTS

| | | | |
|---|---|---|---|
| 2,764,999 A | | 10/1956 | Stanbury |
| 2,774,619 A | * | 12/1956 | Mercier .................. F16J 15/32 277/549 |
| 2,829,672 A | | 4/1958 | Bleasdale |
| 3,136,340 A | * | 6/1964 | Wildi ........................ F15B 1/24 138/31 |
| 3,162,213 A | * | 12/1964 | Peters .................. F16L 55/053 138/30 |
| 3,198,213 A | * | 8/1965 | Schindel .................. F15B 1/24 138/31 |
| 3,379,216 A | * | 4/1968 | Mercier .................. F15B 1/125 138/30 |
| 3,572,389 A | | 3/1971 | Wieland |
| 4,492,013 A | | 1/1985 | Porel |
| 5,219,000 A | * | 6/1993 | Chalasani ................. F15B 1/22 138/26 |
| 9,574,583 B2 | * | 2/2017 | Giorgini .................... F15B 1/24 |
| 10,465,718 B2 | | 11/2019 | Arikawa |
| 2002/0020758 A1 | * | 2/2002 | Umetsu .................. F15B 1/103 239/88 |
| 2004/0231738 A1 | * | 11/2004 | Suzuki .................... F15B 1/103 138/31 |
| 2006/0037658 A1 | | 2/2006 | Shimbori |
| 2010/0108168 A1 | | 5/2010 | Ota |
| 2010/0193059 A1 | | 8/2010 | Nakaoka |
| 2011/0308383 A1 | * | 12/2011 | Hillesheim ............... F15B 1/24 92/248 |
| 2018/0245606 A1 | * | 8/2018 | Yamamoto ............ F16L 55/053 |
| 2020/0158144 A1 | * | 5/2020 | Arikawa ................... F15B 1/14 |

FOREIGN PATENT DOCUMENTS

| | | |
|---|---|---|
| JP | S4920001 B1 | 5/1974 |
| JP | H0246301 A | 2/1990 |
| JP | 2003074503 A | 3/2003 |
| JP | 3148349 U | 2/2009 |
| JP | 2009236137 A | 10/2009 |
| JP | 2010112431 A | 5/2010 |
| JP | 2012237415 A | 12/2012 |
| KR | 101522984 B1 | 5/2015 |
| WO | 2016208478 A1 | 12/2016 |

OTHER PUBLICATIONS

International Preliminary Report on Patentability issued in Intl. Appln. No. PCT/JP2018/002307 dated Sep. 26, 2019. English translation provided.
International Search Report issued in International Application No. PCT/JP2018/002307 dated Mar. 20, 2018. English translation provided.
Written Opinion issued in International Application No. PCT/JP2018/002307 dated Mar. 20, 2018.
Office Action issued in Korean Appln. No. 10-2019-7025532 dated Aug. 13, 2020. English machine translation provided.
Extended European Search Report issued in European Appln. No. 18768011.1 dated Jan. 29, 2020.
Office Action issued in Chinese Appln. No. 201880017239.6 dated Mar. 30, 2020. English machine translation provided.

* cited by examiner

ACCUMULATOR

TECHNICAL FIELD

The present invention relates to an accumulator used in a hydraulic circuit.

BACKGROUND ART

Conventionally, metal bellows accumulators (accumulating/buffering device) are used in hydraulic circuits such as a hydraulic oil circuit of a hydraulic control device or a hydraulic oil circuit using a shock absorber. The metal bellows accumulator generally includes a pressure vessel formed by joining a bottomed cylindrical shell and a cover by welding or the like. The pressure vessel accommodates a bellows mechanism including a bellows which is flexible in the longitudinal direction (axial direction) of the shell and a partition plate (bellows cap) composed of a metal member and a seal adhering to the metal member having a trapezoidal cross-section.

In such an accumulator, the interior of the pressure vessel is divided by the bellows mechanism into a gas chamber and a liquid chamber (oil chamber). In the pressure vessel, pressure fluctuation in liquid flowing into the hydraulic circuit and the accumulator is buffered by the swell and shrink function of gas in the gas chamber in response to expansion and contraction of the bellows mechanism (see Patent Documents 1 and 2, for instance).

The aforementioned conventional accumulator is connected at one end of the pressure vessel (e.g., cover-side end in the longitudinal direction of the pressure vessel) to the hydraulic circuit so that a liquid (working fluid) can flow between the hydraulic circuit and the liquid chamber via a communication hole provided in the cover.

CITATION LIST

Patent Literature

Patent Document 1: JP3148349U
Patent Document 2: JP2012-237415A

SUMMARY

Problems to be Solved

With the above configuration, for instance, when a working fluid flows into the liquid chamber of the accumulator from the hydraulic circuit via the communication hole in the cover or when a working fluid is stored and reaches approximately the maximum volume of the liquid chamber (i.e., when accumulated), pressure acts on the pressure vessel (particularly, inner wall at the other end of the pressure vessel) in a direction opposite to the hydraulic circuit in the axial direction of the shell. Thus, tension stress acts between the cover and the shell.

Generally, a weld at which different members are joined by welding is often the starting point of cracks or corrosion compared with a portion continuously (seamlessly) formed by a single member. In this regard, in the conventional accumulator disclosed in Patent Documents 1 and 2, a weld line between the cover and the shell is located opposite to the hydraulic circuit across a connection portion between the cover and the hydraulic circuit (e.g., connection portion by thread coupling). Accordingly, if the tension stress is concentrated on the weld, the weld can be the starting point of corrosion or cracks. Further, the conventional accumulator requires many components and many man-hours since its pressure vessel is formed by joining multiple members by welding.

In view of the above, an object of some embodiments of the present invention is to provide an accumulator whereby it is possible to reduce damage risk in the vicinity of the weld line of the pressure vessel.

Solution to the Problems (1) An accumulator according at least one embodiment of the present invention comprises: a pressure vessel including a first section and a second section joined to each other via a joint portion; and a partition portion separating an interior space of the pressure vessel into a liquid chamber and a gas chamber so that a volume ratio between the liquid chamber and the gas chamber in the pressure vessel is variable. The first section includes a thread portion for fastening the accumulator to a support member. The second section includes an abutting portion disposed opposite to the thread portion across the joint portion in an axial direction of the thread portion and configured to abut on the support member when the accumulator is fastened to the support member.

With the above configuration (1), the joint portion of the first section and the second section of the pressure vessel is positioned between the thread portion of the first section and the abutting portion of the second section, and compressive force due to axial force caused at the thread portion effectively acts on the joint portion when the accumulator is fastened to the support member. Thus, it is possible to at least partially cancel tension acting on the joint portion due to pressure difference between inside and outside of the pressure vessel, and it is possible to reduce damage risk in the vicinity of the joint portion of the pressure vessel.

(2) In some embodiments, in the accumulator described in the above (1), the abutting portion is a projection protruding toward the support member in the axial direction of the thread portion.

With the above configuration (2), the accumulator abuts on the support member via the projection protruding toward the support member along the axial direction of the thread portion. Thus, when the accumulator is fastened to the support member, high contact pressure acts on the abutting portion and the support member. Accordingly, it is possible to ensure high gas-tight and liquid-tight properties at the contact portion of the support member and the accumulator.

(3) In some embodiments, in the accumulator described in the above (1) or (2), the first section includes an external cylinder portion extending along the axial direction of the thread portion, and the thread portion is formed on an outer peripheral surface of the external cylinder portion.

With the above configuration (3), since the thread portion is formed on the outer peripheral surface of the external cylinder portion of the first section, it is unnecessary to form a threaded port on the second section, and it is possible to simplify the structure of the second section.

(4) In some embodiments, in the accumulator described in any one of the above (1) to (3), the partition portion includes a bellows configured to expand and contract along the axial direction of the thread portion, and the second section is a single piece including: an internal cylinder portion disposed on an inner peripheral side of the bellows and protruding toward the liquid chamber; and a flange portion connected to an end of the internal cylinder portion so as to extend from the internal cylinder portion toward an outer periphery of the accumulator and having an inner surface to which one end of the bellows is fixed and an outer surface forming the abutting portion.

With the above configuration (4), since the internal cylinder portion for achieving the self-seal structure with the partition portion including the bellows is formed integrally with the flange portion, the number of components and thus the cost are expected to be reduced, compared with the case where the internal cylinder portion and the flange portion separately formed are joined by welding or the like. Further, since it is unnecessary to weld the internal cylinder portion and the flange portion, the manufacturing procedure of the accumulator is simplified. Thus, in addition to the reduction in cost, the quality of products can be easily controlled.

(5) In some embodiments, in the accumulator described in the above (3), the first section is formed by a single piece which includes the external cylinder portion and a bottom plate portion connected to an end of the external cylinder portion opposite to the second section and extending perpendicular to the axial direction, and the bottom plate portion includes a tool engagement portion capable of engaging with a tool for rotating the accumulator.

With the above configuration (5), since both the thread portion and the tool engagement portion are formed in the first section as an integral structure, it is possible to easily improve the coaxial accuracy between the thread portion and the tool engagement portion.

(6) In some embodiments, in the accumulator described in any one of the above (1) to (5), the joint portion is formed along a plane perpendicular to the axial direction of the thread portion.

With the above configuration (6), when the accumulator is fastened to the support member, compressive force due to axial force caused at the thread portion along the axial direction acts on the joint portion between the first section and the second section from the perpendicular direction. Thus, shear force along the interface between the first section and the second section does not act on the joint portion, and compressive force due to axial force caused at the thread portion reliably acts on the weld line.

Advantageous Effects

With the accumulator according to some embodiments of the present invention, it is possible to reduce damage risk in the vicinity of the weld line of the pressure vessel.

DETAILED DESCRIPTION

Illustrative embodiments of the present invention will now be described with reference to the accompanying drawings. It is intended, however, that unless particularly specified, dimensions, materials, shapes, relative positions and the like of components described in the embodiments shall be interpreted as illustrative only and not intended to limit the scope of the present invention unless particularly specified.

First Embodiment

Figure 1:
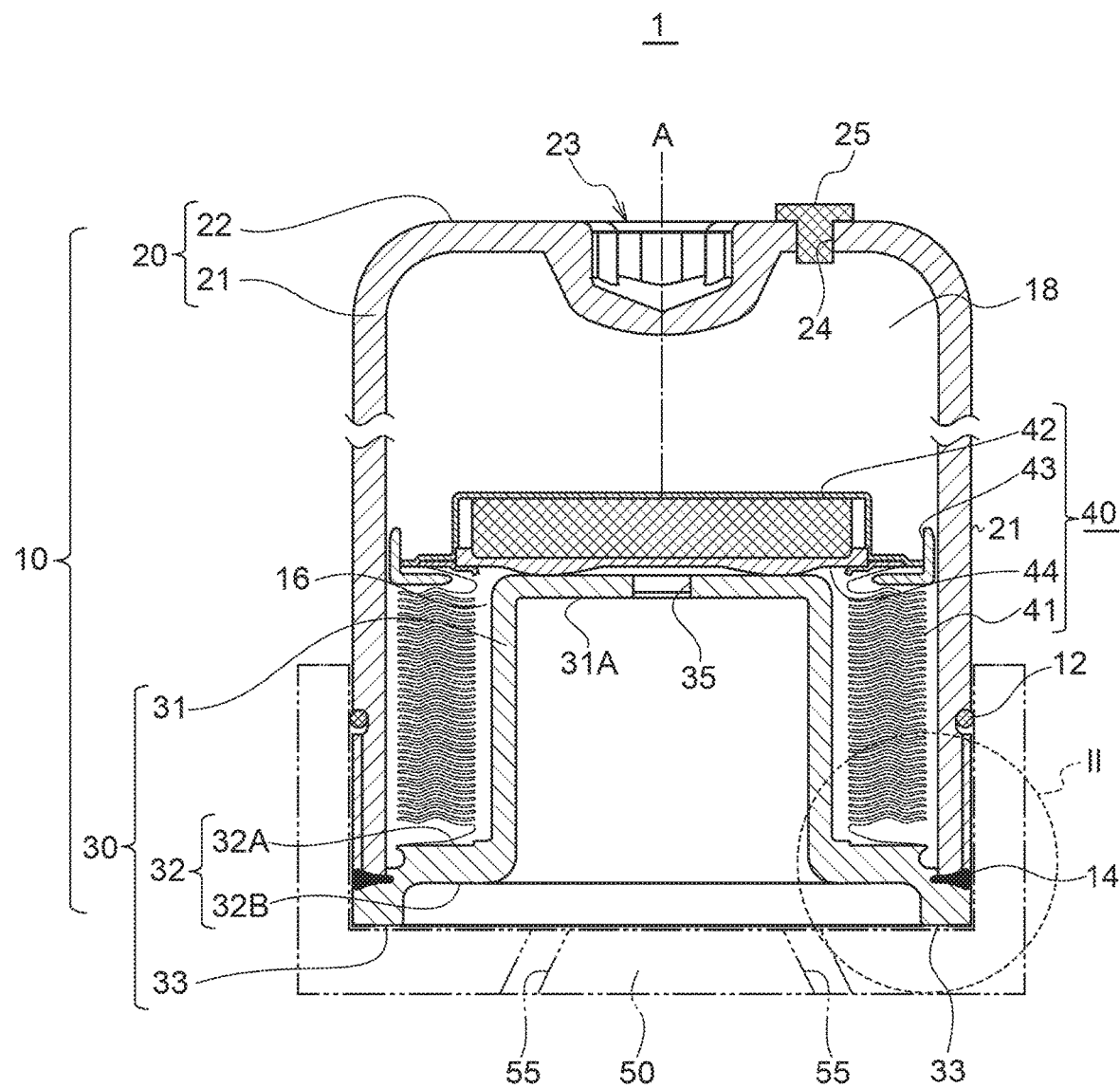
FIG. 1 is a vertical cross-sectional view of an accumulator according to some embodiments.

FIG. 1 is a vertical cross-sectional view of an accumulator 1 according to some embodiments of the present invention. As shown in this figure, the accumulator 1 includes a substantially cylindrical pressure vessel 10 having at least one closed end and a partition portion separating the interior space of the pressure vessel 10 into a liquid chamber 16 (oil chamber) and a gas chamber 18. In some embodiments, the accumulator 1 may include a bellows mechanism 40 accommodated in the pressure vessel 10 as the partition portion.

Such an accumulator 1 is connectable to, for instance, a hydraulic oil circuit for brake or clutch in a vehicle and allows hydraulic oil (working fluid) to flow out of or into the hydraulic oil circuit. That is, the accumulator 1 functions as a buffer device which absorbs or accumulates pressure fluctuation (e.g., pulsation) in hydraulic oil in the hydraulic oil circuit.

In some embodiments, the accumulator 1 may be a so-called outside gas type accumulator 1 in which the liquid chamber 16 is located inside the bellows mechanism 40 (partition portion) while the gas chamber 18 (i.e., gas storage portion) is located outside the bellows mechanism 40 (see FIG. 1, for instance).

In some embodiments, the pressure vessel 10 includes a first section 20 and a second section 30 joined to each other along a weld line 14 as a joint portion.

The first section 20 includes an external cylinder portion 21 formed by a substantially cylindrical steel material (steel pipe) and a bottom plate portion 22 having a substantially circular plate shape and closing one end of the external cylinder portion 21 in the direction of the central axis A. The bottom plate portion 22 is connected to an end of the external cylinder portion 21 opposite to the second section 30 and extends in a plane perpendicular to the axial direction (central axis A).

In some embodiments, the first section 20 may be formed as an integral structure in which the external cylinder portion 21 and the bottom plate portion 22 are continuously formed by a single member. That is, the first section 20 may be formed such that the external cylinder portion 21 and the bottom plate portion 22 are continuous by processing such as pressing or forging, for instance. In some embodiments, the first section 20 may be formed such that the external cylinder portion 21 and the bottom plate portion 22 are continuous along a smooth curve. With this configuration, it is possible to form the pressure vessel 10 in a shape which is unlikely to cause cracks and corrosion due to stress concentration, for instance.

Figure 2:
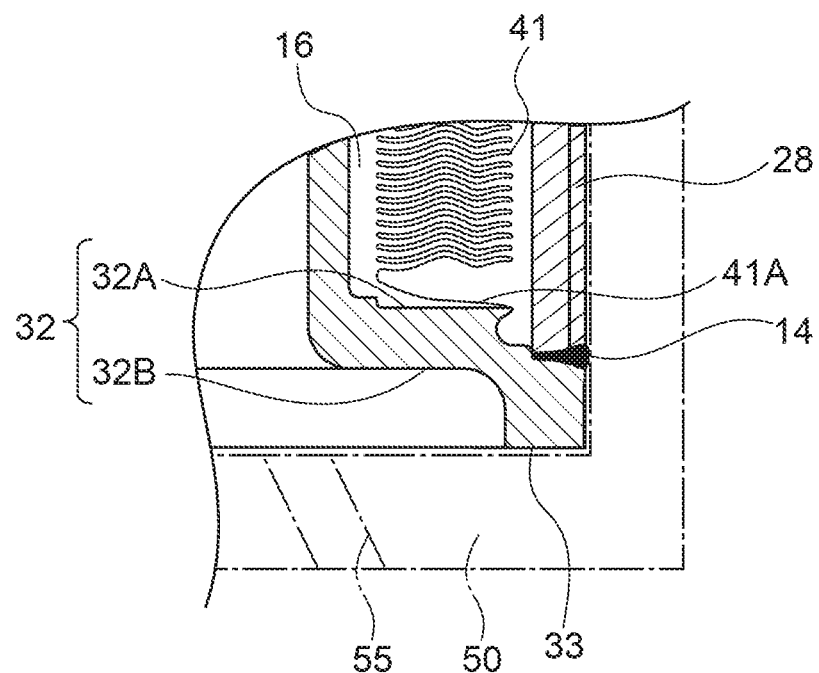
FIG. 2 is an enlarged view of part II shown by the dashed line in FIG. 1.
Figure 3:
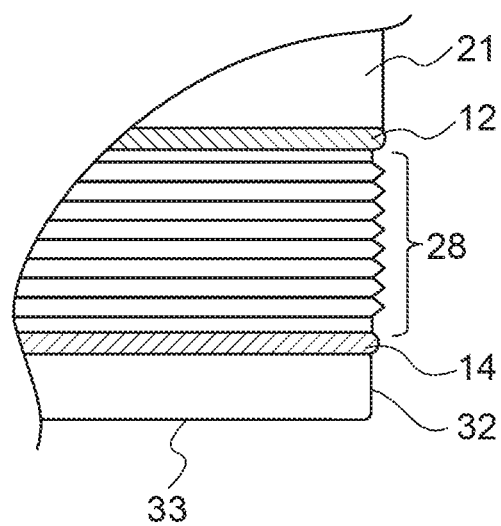
FIG. 3 is a schematic view of an appearance around a thread portion of an accumulator according to some embodiments.

As shown in FIGS. 1 to 3, in some embodiments, a thread portion 28 whose axis is parallel to the central axis A is formed on an outer peripheral surface of the other end (on a side adjacent to the second section 30) of the external cylinder portion 21 (see FIG. 2, for instance). That is, the external cylinder portion 21 extends along the axial direction of the thread portion 28. Thus, the first section 20 includes the thread portion 28 for fastening the accumulator 1 to a support member 50. With this configuration, since the thread portion 28 is formed on the outer peripheral surface of the external cylinder portion 21 of the first section 20, it is unnecessary to form a threaded port for fastening the accumulator 1 to the support member 50 on the second section 30, and it is possible to simplify the structure of the second section 30. The thread portion 28 will be described later.

In some embodiments, the bottom plate portion 22 of the first section 20 is provided with a tool engagement portion 23 capable of engaging with a tool for rotating the accumulator 1 about the central axis A, a through hole 24 for introducing a gas from the outside of the accumulator 1 into the gas chamber 18 inside the accumulator 1, and a gas sealing stopper 25 for sealing the through hole 24 after the gas is charged into the gas chamber 18.

In some embodiments, the tool engagement portion 23 may be formed so as to be recessed (concave) inward along the central axis A and centered on the central axis A in the bottom plate portion 22 (see FIG. 1, for instance). Such a concave tool engagement portion 23 only needs to be able to engage with a tool for imparting a rotational force about the central axis A to the accumulator 1, and may be a recess having a variety of shapes, such as cross (+) or slot (−), polygon such as triangle, square, pentagon, hexagon, octagon, star, or Torx (registered trademark).

Figure 4:
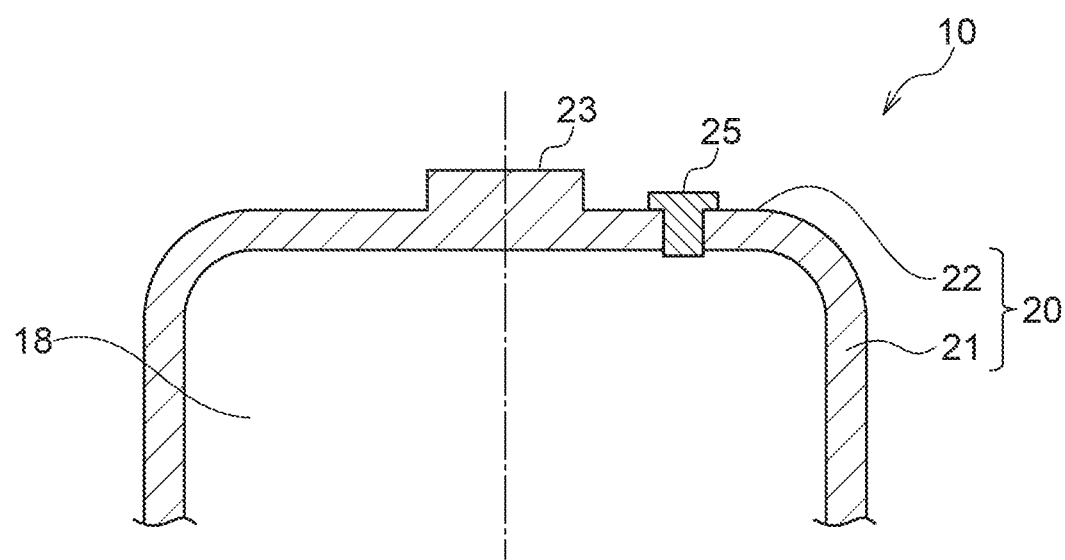
FIG. 4 is a partial cross-sectional view of a pressure vessel according to some embodiments.
Figure 5:
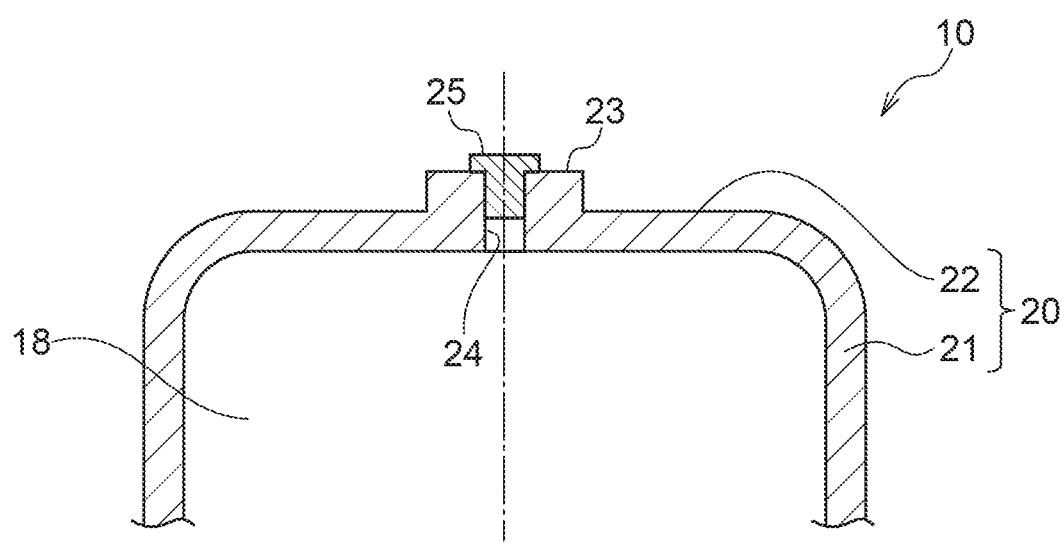
FIG. 5 is a partial cross-sectional view of a pressure vessel according to some embodiments.

In some embodiments, the tool engagement portion 23 may be formed so as to protrude outward along the direction of the central axis A and centered on the central axis A in the bottom plate portion 22 of the first section 20 (see FIGS. 4 and 5, for instance). Such a convex tool engagement portion 23 only needs to be able to engage with a tool for imparting a rotational force about the central axis A to the accumulator 1, and may have a variety of polygonal shapes, such as triangle, square, pentagon, hexagon, octagon or star.

With the accumulator 1 according to the above embodiments, since both the thread portion 28 and the tool engagement portion 23 are formed in the first section 20 as an integral structure, it is possible to easily improve the coaxial accuracy between the thread portion 28 and the tool engagement portion 23.

In some embodiments, the through hole 24 and the gas sealing stopper 25 may be offset and displaced from the central axis A and the tool engagement portion 23 in the radial direction (see FIGS. 1 and 4, for instance), or may be placed along the central axis A (see FIG. 5, for instance).

In some embodiments, the gas sealing stopper 25 is attached to the bottom plate portion 22 by welding such as resistance welding to seal the through hole 24 after the gas is charged into the gas chamber 18.

In some embodiments, the second section 30 includes a bottomed cylindrical internal cylinder portion 31 concentric with the external cylinder portion 21 inside the external cylinder portion 21 of the first section 20, and a flange portion 32 extending from one end of the internal cylinder portion 31 toward the outer periphery (outward in the radial direction of the internal cylinder portion 31).

In some embodiments, the internal cylinder portion 31 is formed on the inner peripheral side of a bellows 41, described later, so as to protrude toward the liquid chamber 16. A bottom 31A of the internal cylinder portion 31 may be a substantially circular flat plate extending perpendicular to the central axis A. At least one through hole 35 connecting a hydraulic oil circuit (hydraulic circuit) and the liquid chamber 16 is formed at the center of the bottom 31A of the internal cylinder portion 31 (see FIG. 1, for instance).

In some embodiments, the flange portion 32 is connected to an end of the internal cylinder portion 31 adjacent to the support member 50 so as to extend outward in the radial direction of the internal cylinder portion 31 from the end of the internal cylinder portion 31. In some embodiments, the internal cylinder portion 31 and the flange portion 32 are continuously formed by a single member as an integral structure. That is, the second section 30 may be formed such that the internal cylinder portion 31 and the flange portion 32 are continuous and have a convex or hat-like cross-section, for instance, by processing such as pressing or forging.

With this configuration, since the internal cylinder portion 31 for achieving the self-seal structure with the bellows mechanism 40 (partition portion) including the bellows 41 is formed integrally with the flange portion 32, the number of components and thus the cost are expected to be reduced, compared with the case where the internal cylinder portion 31 and the flange portion 32 separately formed are joined by welding or the like. The reduction in the number of components reduces welding portions or reduces or eliminates welding process between the internal cylinder portion 31 and the flange portion 32, thus simplifying the manufacturing procedure of the accumulator 1. Consequently, in addition to the reduction in cost, the quality of products can be easily controlled.

In some embodiments, the flange portion 32 is connected at the outermost edge to the other end of the external cylinder portion 21. That is, the outer diameter of the flange portion 32 is substantially the same as the outer diameter of the external cylinder portion 21.

The flange portion 32 has an inner surface 32A facing toward the liquid chamber 16 which is inside the pressure vessel 10 and an outer surface 32B facing toward the support member 50 which is outside the pressure vessel 10. A fixation portion 41A (see FIG. 2, for instance) disposed at one end of the bellows 41 is fixed to the inner surface 32A by welding. The welding may be electron beam welding or laser beam welding, for instance.

In some embodiments, the outer surface 32B of the flange portion 32 has an abutting portion 33 to abut on the support member 50. That is, the second section 30 includes the abutting portion 33 configured to abut on the support member 50 when the accumulator 1 is fastened to the support member 50. The abutting portion 33 is disposed opposite to the thread portion 28 across the weld line 14 in the axial direction of the thread portion 28 (see FIGS. 1 and 2, for instance).

In some embodiments, the abutting portion 33 may be an annular projection formed by an outer peripheral portion of the flange portion 32 protruding toward the support member 50 at a predetermined thickness. In some embodiments, the abutting portion 33 is formed with a predetermined width (thickness) so as to come into surface contact with the support member 50. In another embodiments, the abutting portion 33 may be formed with a relatively thin thickness so as to come into line contact with the support member 50. The thickness, shape and position of the abutting portion 33 may be appropriately designed so that hydraulic oil in the hydraulic oil circuit is appropriately sealed by the abutting portion 33, the thread portion 28 and an O-ring 12 or the like when the accumulator 1 is attached to the support member 50 by the thread portion 28.

In some embodiments, the bellows mechanism 40 functions as the partition portion which separates the interior space of the pressure vessel 10 into the liquid chamber 16 and the gas chamber 18 so that a volume ratio between the liquid chamber 16 and the gas chamber 18 in the pressure vessel 10 is variable. In some embodiments, the bellows mechanism 40 includes a bellows 41 (metal bellows) configured to expand and contract along the axial direction (central axis A) of the thread portion 28, a disc-like bellows cap 42 connected to the other end of the bellows 41, a bellows guide 43 disposed on the outer periphery of the bellows cap 42, and a seal 44 disposed on the liquid chamber 16 side of the bellows cap 42.

In some embodiments, the bellows guide 43 guides and moves the bellows 41, the bellows cap 42, and the seal 44 along the direction of the central axis A in accordance with the change in volume ratio between the liquid chamber 16 and the gas chamber 18 due to inflow and outflow of hydraulic oil between the hydraulic oil circuit and the liquid chamber 16. In some embodiments, the bellows guide 43 abuts on the inner peripheral surface of the external cylinder portion 21 so as to ensure liquid-tight and gas-tight properties between the liquid chamber 16 and the gas chamber 18. In some embodiments, the bellows guide 43 is configured to slidably move on and along the inner peripheral surface of the external cylinder portion 21 (in the direction of the central axis A) in response to the change in volume ratio between the liquid chamber 16 and the gas chamber 18. FIG. 1 shows a state where the bellows mechanism 40 contracts and the volume ratio of the liquid chamber 16 is minimized.

The seal 44 (stay self seal) liquid-tightly seals the liquid chamber 16 when the bellows 41 maximally contracts, i.e., when the volume ratio of the liquid chamber 16 is minimized while the volume ratio of the gas chamber 18 is maximized (see FIG. 1, for instance).

Then, the thread portion 28 according to the present invention will be described.

In some embodiments, the thread portion 28 (male thread) is formed on the outer periphery of the other end of the external cylinder portion 21. By screwing the thread portion 28 with a thread portion (female thread) formed in the support member 50, the accumulator 1 is connected to the hydraulic oil circuit.

In some embodiments, the thread portion 28 may extend to a position adjoining the weld line 14. In other embodiments, the thread portion 28 may be formed so as not to reach the weld line 14. In other words, in some embodiments, a thread-free portion may be formed between the thread portion 28 and the weld line 14.

In some embodiments, when viewed from the direction of the central axis A, radial positions of the thread portion 28 and the weld line 14 may overlap. In some embodiments, when viewed from the direction of the central axis A, radial positions of the abutting portion 33 and the weld line 14 may overlap. Further, in some embodiments, when viewed from the direction of the central axis A, radial positions of the thread portion 28, the weld line 14, and the abutting portion 33 may overlap.

The groove direction of the weld line 14 may extend in a direction perpendicular to the axial direction of the thread portion 28 (i.e., in the radial direction). More specifically, the other end (end adjacent to the support member 50) of the external cylinder portion 21 of the first section 20 may face an outermost edge of the inner peripheral surface 32A of the flange portion 32 of the second section 30. As a result, compressive force due to axial force of the thread portion 28 effectively acts on the weld line 14 from the perpendicular direction (straight ahead).

With this configuration, since the weld line 14 between the first section 20 and the second section 30 of the pressure vessel 10 is positioned between the thread portion 28 of the first section 20 and the abutting portion 33 of the second section 30, compressive force due to axial force caused at the thread portion 28 effectively acts on the weld line 14 when the accumulator 1 is fastened to the support member 50. Thus, it is possible to at least partially cancel tension acting on the weld line 14 due to pressure difference between inside and outside of the pressure vessel 10, and it is possible to reduce damage risk in the vicinity of the weld line 14 of the pressure vessel 10.

In some embodiments, an O-ring 12 for sealing is disposed on the outer periphery of the external cylinder portion 21 on a side opposite to the support member 50 across the thread portion 28. In some embodiments, the external cylinder portion 21 may include an engagement groove for receiving the O-ring 12 along the outer periphery thereof. In some embodiments, the engagement groove may be formed along and adjacent to the thread portion 28 on a side opposite to the support member 50 across the thread portion 28.

Figure 6:
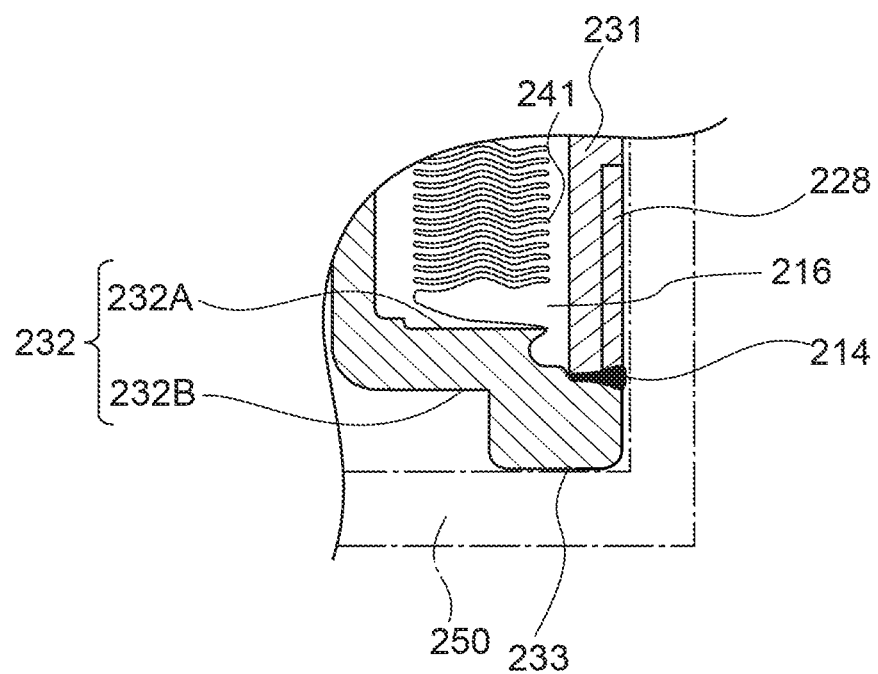
FIG. 6 is a partial cross-sectional view of a pressure vessel according to some embodiments.

In some embodiments, for instance, as shown in FIG. 6, a thread portion 228 (female thread) may be formed on the inner peripheral side of the internal cylinder portion 231. More specifically, by screwing the thread portion 228 formed as a female thread with a male thread formed in the support member 250, the accumulator 201 may be connected to the hydraulic oil circuit. In this case, the internal cylinder portion 231 functions as the first section including the thread portion 228 for fastening the accumulator 201 to the support member. Further, by providing an abutting portion 233 on an outer peripheral surface 232B of the flange portion 232 (inner flange) having an inner surface 232A connected to one end of the bellows 241, the outer member including the flange portion 232 functions as the second section. FIG. 6 shows an example of outside gas type in which the liquid chamber 216 is formed between the bellows 241 and the internal cylinder portion 231.

With this configuration, as in the above embodiments, compressive force due to axial force caused at the thread portion 228 effectively acts on the weld line 214 when the accumulator 201 is fastened to the support member 50. Thus, it is possible to at least partially cancel tension acting on the weld line 214 due to pressure difference between inside and outside of the pressure vessel 10, and it is possible to reduce damage risk in the vicinity of the weld line 214 of the pressure vessel 10.

Second Embodiment

Figure 7:
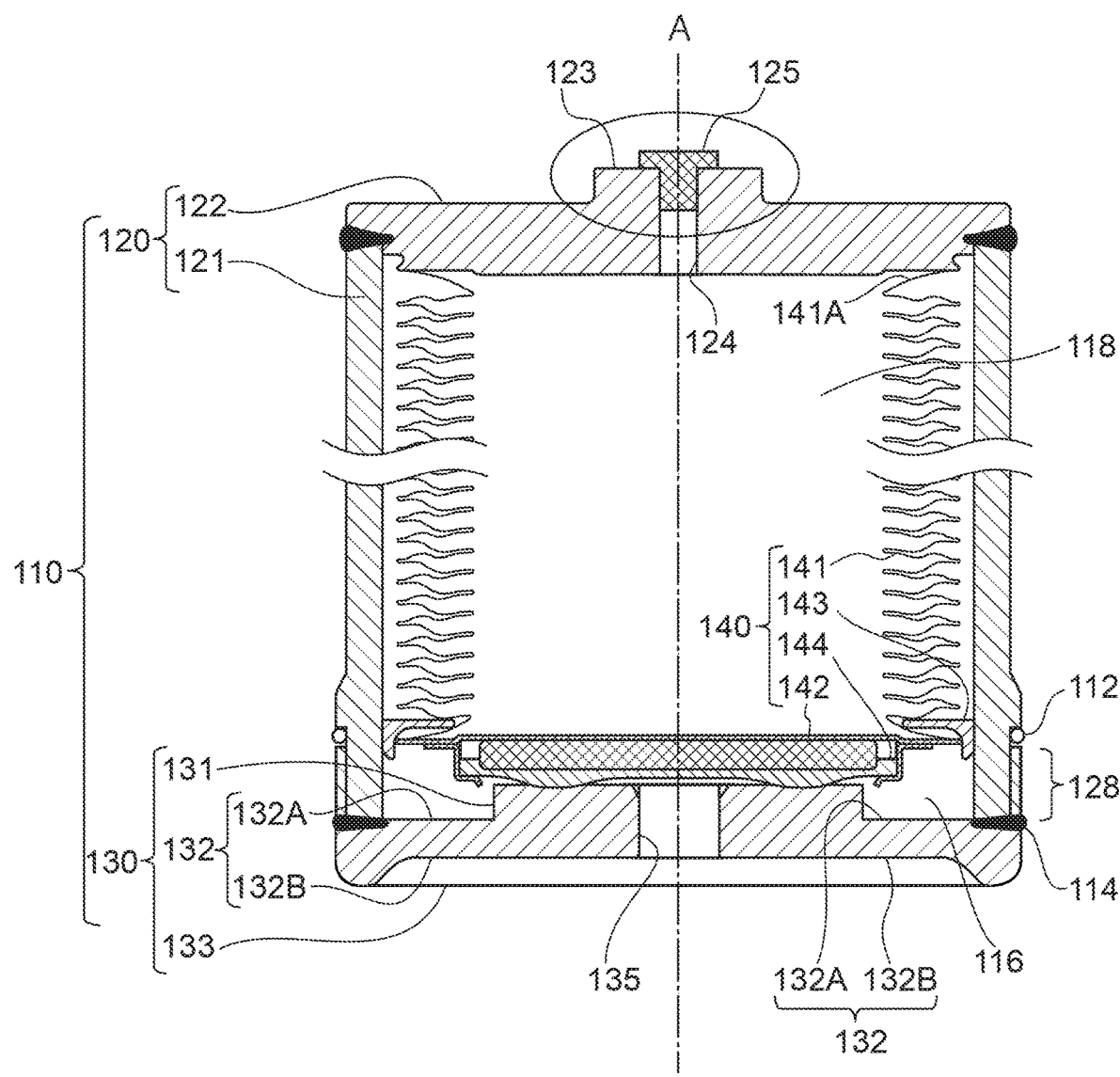
FIG. 7 is a partial cross-sectional view of a pressure vessel according to some embodiments.

FIG. 7 is a vertical cross-sectional view of an accumulator 101 according to some embodiments of the present invention. As shown in this figure, the accumulator 101 includes a substantially cylindrical pressure vessel 110 having at least one closed end and a partition portion separating the interior space of the pressure vessel 110 into a liquid chamber 116 (oil chamber) and a gas chamber 118. In some embodiments, the accumulator 101 may include a bellows mechanism 140 accommodated in the pressure vessel 110 as the partition portion. Such an accumulator 101 is connectable to, for instance, a hydraulic oil circuit for brake or clutch in a vehicle and allows hydraulic oil (working fluid) to flow out of or into the hydraulic oil circuit. That is, the accumulator 101 functions as a buffer device which absorbs or accumulates pressure fluctuation (e.g., pulsation) in hydraulic oil in the hydraulic oil circuit.

In some embodiments, the accumulator 101 may be a so-called inside gas type accumulator 101 in which a liquid chamber 116 is located outside a bellows mechanism 140

(partition portion) while a gas chamber 118 (gas storage portion) is located inside the bellows mechanism 140 (see FIG. 7, for instance).

In some embodiments, a pressure vessel 110 includes a first section 120 and a second section 130 joined to each other along a weld line 114.

The first section 120 includes an external cylinder portion 121 formed by a substantially cylindrical steel material (steel pipe) and a bottom plate portion 122 having a substantially circular plate shape and closing one end of the external cylinder portion 121 in the direction of the central axis A. The bottom plate portion 122 is connected to an end of the external cylinder portion 121 opposite to the second section 130 and extends in a plane perpendicular to the axial direction (central axis A).

In some embodiments, the external cylinder portion 121 and the bottom plate portion 122 are connected by welding. More specifically, one end portion of the external cylinder portion 121 along the central axis A is welded and fixed to a facing outer peripheral edge portion of the bottom plate portion 122 on the inner surface of the pressure vessel 110. In some embodiments, a fixation portion 141A (see FIG. 7, for instance) disposed at one end of the bellows 141 is fixed to the inner surface of the bottom plate portion 122 by welding. The welding may be electron beam welding or laser beam welding, for instance.

As shown in FIG. 7, in some embodiments, a thread portion 128 whose axis is parallel to the central axis A is formed on an outer peripheral surface of the other end (on a side adjacent to the second section 130) of the external cylinder portion 121. That is, the external cylinder portion 121 extends along the axial direction of the thread portion 128. Thus, the first section 120 includes the thread portion 128 for fastening the accumulator 1 to a support member 50. With this configuration, since the thread portion 128 is formed on the outer peripheral surface of the external cylinder portion 121 of the first section 120, it is unnecessary to form a threaded port for fastening the accumulator 101 to the support member 50 on the second section 130, and it is possible to simplify the structure of the second section 130.

In some embodiments, the bottom plate portion 122 of the first section 120 is provided with a tool engagement portion 123 capable of engaging with a tool for rotating the accumulator 101 about the central axis A, a through hole 124 for introducing a gas from the outside of the accumulator 101 into the gas chamber 118 inside the accumulator 101, and a gas sealing stopper 125 for sealing the through hole 124 after the gas is charged into the gas chamber 118.

In some embodiments, the tool engagement portion 123 may be formed so as to protrude outward along the direction of the central axis A and centered on the central axis A in the bottom plate portion 122 of the first section 120 (see FIG. 7, for instance). Such a convex tool engagement portion 123 only needs to be able to engage with a tool for imparting a rotational force about the central axis A to the accumulator 101, and may have a variety of polygonal shapes, such as triangle, square, pentagon, hexagon, octagon or star.

Figure 8:
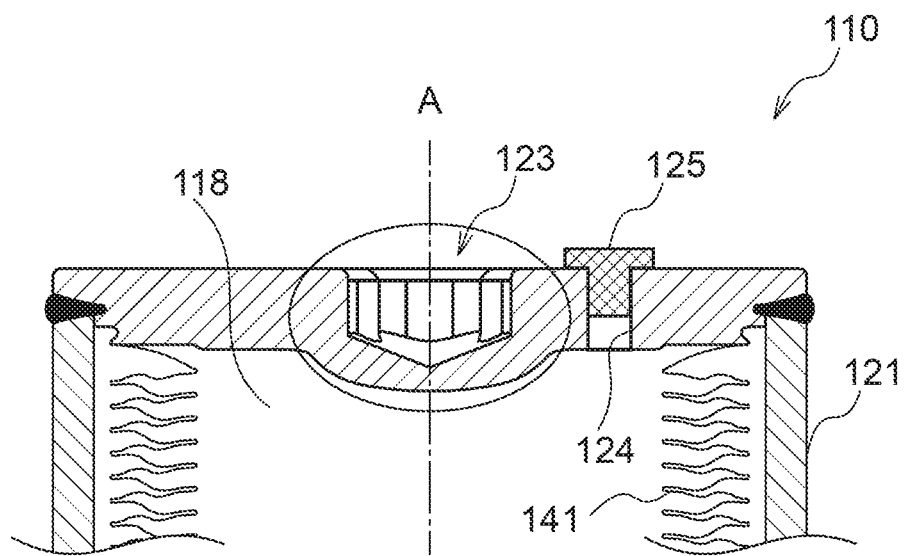
FIG. 8 is a vertical cross-sectional view of an accumulator according to some embodiments.

In some embodiments, the tool engagement portion 123 may be formed so as to be recessed (concave) inward along the direction of the central axis A and centered on the central axis A in the bottom plate portion 122 (see FIG. 8, for instance). Such a concave tool engagement portion 123 only needs to be able to engage with a tool for imparting a rotational force about the central axis A to the accumulator 101, and may be a recess having a variety of shapes, such as cross (+) or slot (−), polygon such as triangle, square, pentagon, hexagon, octagon, star, or Torx (registered trademark).

With the accumulator 101 according to the above embodiments, since both the thread portion 128 and the tool engagement portion 123 are formed in the first section 120, it is possible to easily improve the coaxial accuracy between the thread portion 128 and the tool engagement portion 123.

In some embodiments, the through hole 124 and the gas sealing stopper 125 may be offset and displaced from the central axis A and the tool engagement portion 123 in the radial direction (see FIG. 8, for instance), or may be placed along the central axis A (see FIG. 7, for instance).

In some embodiments, the gas sealing stopper 125 is attached to the bottom plate portion 122 by welding such as resistance welding to seal the through hole 124 after the gas is charged into the gas chamber 118.

In some embodiments, the second section 130 includes a bottomed cylindrical internal cylinder portion 131 concentric with the external cylinder portion 120 inside the external cylinder portion 21 of the first section 120, and a flange portion 132 extending from one end of the internal cylinder portion 131 toward the outer periphery (outward in the radial direction of the internal cylinder portion 131).

In some embodiments, the internal cylinder portion 131 is formed outside a bellows 141, described later, so as to protrude toward the liquid chamber 116. A surface of the internal cylinder portion 131 facing the liquid chamber 116 may be a substantially annular flat surface extending perpendicular to the central axis A. At least one through hole 135 connecting a hydraulic oil circuit (hydraulic circuit) and the liquid chamber 116 is formed at the center of the internal cylinder portion 131 (see FIG. 7, for instance).

In some embodiments, the flange portion 132 is connected to an end of the internal cylinder portion 131 adjacent to the support member 50 so as to extend outward in the radial direction of the internal cylinder portion 131 from the end of the internal cylinder portion 131. In some embodiments, the internal cylinder portion 131 and the flange portion 132 are continuously formed by a single member as an integral structure. That is, the second section 130 may be formed such that the internal cylinder portion 131 and the flange portion 132 are continuous and have a convex or hat-like cross-section, for instance, by processing such as pressing or forging.

With this configuration, since the internal cylinder portion 131 for achieving the self-seal structure with the bellows mechanism 140 (partition portion) including the bellows 141 is formed integrally with the flange portion 132, the number of components and thus the cost are expected to be reduced, compared with the case where the internal cylinder portion 131 and the flange portion 132 separately formed are joined by welding or the like. The reduction in the number of components reduces welding portions or reduces or eliminates welding process between the internal cylinder portion 131 and the flange portion 132, thus simplifying the manufacturing procedure of the accumulator 101. Consequently, in addition to the reduction in cost, the quality of products can be easily controlled.

In some embodiments, the flange portion 132 is connected at the outermost edge to the other end of the external cylinder portion 121. That is, the outer diameter of the flange portion 132 is substantially the same as the outer diameter of the external cylinder portion 121.

The flange portion 132 has an inner surface 132A facing toward the liquid chamber 116 which is inside the pressure vessel 110 and an outer surface 132B facing toward the support member 50 which is outside the pressure vessel 110.

In some embodiments, the outer surface 132B of the flange portion 132 has an abutting portion 133 to abut on the support member 50. That is, the second section 130 includes the abutting portion 133 configured to abut on the support member 50 when the accumulator 101 is fastened to the support member 50. The abutting portion 133 is disposed opposite to the thread portion 128 across the weld line 114 in the axial direction of the thread portion 128 (see FIG. 7, for instance).

In some embodiments, the abutting portion 133 may be an annular projection formed by an outer peripheral portion of the flange portion 132 protruding toward the support member 50 at a predetermined thickness. In some embodiments, the abutting portion 133 is formed with a predetermined width (thickness) so as to come into surface contact with the support member 50. In another embodiments, the abutting portion 133 may be formed with a relatively thin thickness so as to come into line contact with the support member 50. The thickness, shape and position of the abutting portion 133 may be appropriately designed so that hydraulic oil in the hydraulic oil circuit is appropriately sealed by the abutting portion 133, the thread portion 128 and the O-ring 112 or the like when the accumulator 101 is attached to the support member 50 by the thread portion 128.

In some embodiments, the bellows mechanism 140 functions as the partition portion which separates the interior space of the pressure vessel 110 into the liquid chamber 116 and the gas chamber 118 so that a volume ratio between the liquid chamber 116 and the gas chamber 118 in the pressure vessel 110 is variable. In some embodiments, the bellows mechanism 140 includes a bellows 141 (metal bellows) configured to expand and contract along the axial direction (central axis A) of the thread portion 128, a disc-like bellows cap 142 connected to the other end of the bellows 141, a bellows guide 143 disposed on the outer periphery of the bellows cap 142, and a seal 144 disposed on the liquid chamber 116 side of the bellows cap 142.

In some embodiments, the bellows guide 143 guides and moves the bellows 141, the bellows cap 142, and the seal 144 along the direction of the central axis A in accordance with the change in volume ratio between the liquid chamber 116 and the gas chamber 118 in response to inflow and outflow of hydraulic oil between the hydraulic oil circuit and the liquid chamber 116. In some embodiments, the bellows guide 143 abuts on the inner peripheral surface of the external cylinder portion 121 so as to ensure liquid-tight and gas-tight properties between the liquid chamber 116 and the gas chamber 118. In some embodiments, the bellows guide 143 is configured to slidably move on and along the inner peripheral surface of the external cylinder portion 121 (in the direction of the central axis A) in response to the change in volume ratio between the liquid chamber 116 and the gas chamber 118. FIG. 7 shows a state where the bellows mechanism 140 expands and the volume ratio of the liquid chamber 116 is minimized.

The seal 144 (stay self seal) liquid-tightly seals the liquid chamber 116 when the bellows 141 maximally expands, i.e., when the volume ratio of the liquid chamber 116 is minimized while the volume ratio of the gas chamber 118 is maximized (see FIG. 7, for instance).

Then, the thread portion 128 according to the present invention will be described specifically.

In some embodiments, the thread portion 128 may extend to a position adjoining the weld line 114. In other embodiments, the thread portion 128 may be formed so as not to reach the weld line 114. In other words, in some embodiments, a thread-free portion may be formed between the thread portion 128 and the weld line 114.

In some embodiments, when viewed from the direction of the central axis A, radial positions of the thread portion 128 and the weld line 114 may overlap. In some embodiments, when viewed from the direction of the central axis A, radial positions of the abutting portion 133 and the weld line 114 may overlap. Further, in some embodiments, when viewed from the direction of the central axis A, radial positions of the thread portion 128, the weld line 114, and the abutting portion 133 may overlap.

The groove direction of the weld line 114 may extend in a direction perpendicular to the axial direction of the thread portion 128 (i.e., in the radial direction). More specifically, the other end (end adjacent to the support member 50) of the external cylinder portion 121 of the first section 120 may face an outermost edge of the inner peripheral surface 132A of the flange portion 132 of the second section 130. As a result, compressive force due to axial force of the thread portion 128 effectively acts on the weld line 114 from the perpendicular direction (straight ahead).

With this configuration, since the weld line 114 between the first section 120 and the second section 130 of the pressure vessel 110 is positioned between the thread portion 128 of the first section 120 and the abutting portion 133 of the second section 130, compressive force due to axial force caused at the thread portion 128 effectively acts on the weld line 114 when the accumulator 101 is fastened to the support member 50. Thus, it is possible to at least partially cancel tension acting on the weld line 114 due to pressure difference between inside and outside of the pressure vessel 120, and it is possible to reduce damage risk in the vicinity of the weld line 114 of the pressure vessel 110.

In some embodiments, an O-ring 112 for sealing is disposed on the outer periphery of the external cylinder portion 121 on a side opposite to the support member 50 across the thread portion 128. In some embodiments, the external cylinder portion 121 may include an engagement groove for receiving the O-ring 112 along the outer periphery thereof. In some embodiments, the engagement groove may be formed along and adjacent to the thread portion 128 on a side opposite to the support member 50 across the thread portion 128.

As described above, with the accumulator 101 according to some embodiments of the present invention, the weld line 114 between the first section 120 and the second section 130 of the pressure vessel 110 is positioned between the thread portion 128 of the first section 120 and the abutting portion 133 of the second section 130. Accordingly, compressive force due to axial force caused at the thread portion 128 effectively acts on the weld line 114 when the accumulator 101 is fastened to the support member 50. Thus, it is possible to at least partially cancel tension acting on the weld line 114 due to pressure difference between inside and outside of the pressure vessel 120, and it is possible to reduce damage risk in the vicinity of the weld line 114 of the pressure vessel 110.

Embodiments of the present invention were described in detail above, but the present invention is not limited thereto, and various amendments and modifications may be implemented.

REFERENCE SIGNS LIST 1, 101, 201 Accumulator
10, 110 Pressure vessel
12, 112 O-ring 14, 114, 214 Weld line (Joint portion)
16, 116 Liquid chamber (Oil chamber)
18, 118 Gas chamber
20, 120 First section
21, 121 External cylinder portion
22, 122 Bottom plate portion
23, 123 Tool engagement portion
24, 124 Through hole
25, 125 Gas sealing stopper
28, 128 Thread portion
30, 130 Second section
31, 131, 231 Internal cylinder portion
31A Bottom
32, 132 Flange portion
32A, 132A Inner surface
32B, 132B Outer surface
33, 133 Abutting portion (Projection)
35, 135 Through hole
40, 140 Bellows mechanism (Partition portion)
41, 141 Bellows
41A, 141A Fixation portion
42, 142 Bellows cap
43, 143 Bellows guide
44, 144 Seal
50, 250 Support member
55, 255 Communication hole
A Central axis

The invention claimed is:

1. An accumulator comprising:
a pressure vessel including a first section and a second section joined to each other via a welded portion; and
a partition portion separating an interior space of the pressure vessel into a liquid chamber and a gas chamber so that a volume ratio between the liquid chamber and the gas chamber in the pressure vessel is variable,
wherein the first section includes a thread portion for fastening the accumulator to a support member, the support member being configured to connect the accumulator to a hydraulic oil circuit via a communication hole in the support member,
wherein the second section includes an abutting portion disposed opposite to the thread portion across the welded portion in an axial direction of the thread portion and configured to abut on the support member when the accumulator is fastened to the support member, and
wherein the abutting portion is configured to be exposed to hydraulic oil in the hydraulic oil circuit when the accumulator is fastened to the support member by the thread portion and connected to the hydraulic oil circuit, and the abutting portion and the thread portion act to seal the hydraulic oil in the hydraulic oil circuit when the accumulator is fastened to the support member by the thread portion and connected to the hydraulic oil circuit.

2. The accumulator according to claim 1,
wherein the abutting portion is a projection protruding toward the support member in the axial direction of the thread portion.

3. The accumulator according to claim 1,
wherein the first section includes an external cylinder portion extending along the axial direction of the thread portion, and
wherein the thread portion is formed on an outer peripheral surface of the external cylinder portion.

4. The accumulator according to claim 1,
wherein the partition portion includes a bellows configured to expand and contract along the axial direction of the thread portion, and
wherein the second section is a single piece including:
an internal cylinder portion disposed on an inner peripheral side of the bellows and protruding toward the liquid chamber; and
a flange portion connected to an end of the internal cylinder portion so as to extend from the internal cylinder portion toward an outer periphery of the accumulator, the flange portion having an inner surface to which one end of the bellows is fixed and an outer surface forming the abutting portion.

5. The accumulator according to claim 3,
wherein the first section is formed by a single piece which includes the external cylinder portion and a bottom plate portion connected to an end of the external cylinder portion opposite to the second section and extending perpendicular to the axial direction, and
wherein the bottom plate portion includes a tool engagement portion capable of engaging with a tool for rotating the accumulator.

6. The accumulator according to claim 1,
wherein the welded portion is formed along a plane perpendicular to the axial direction of the thread portion.

7. The accumulator according to claim 1,
wherein the welded portion contacts both of the thread portion and the abutting portion.

8. The accumulator according to claim 1,
wherein the abutting portion is disposed opposite to the thread portion across the welded portion in the axial direction such that a compressive force due to an axial force by the thread portion acts on the welded portion.

9. The accumulator according to claim 1, further comprising a sealing member disposed on an outer periphery of the first section such that the thread portion is disposed between the welded portion and the sealing member along the axial direction of the thread portion,
wherein the abutting portion, the thread portion, and the sealing member act to seal the hydraulic oil in the hydraulic oil circuit when the accumulator is fastened to the support member by the thread portion and connected to the hydraulic oil circuit.

10. The accumulator according to claim 9,
wherein the sealing member is an O-ring.

11. The accumulator according to claim 10,
wherein the outer periphery of the first section includes a groove in which the O-ring is disposed.

* * * * *